(12) United States Patent
McKennoch et al.

(10) Patent No.: US 11,373,318 B1
(45) Date of Patent: Jun. 28, 2022

(54) IMPACT DETECTION

(71) Applicant: Vulcan Inc., Seattle, WA (US)

(72) Inventors: Samuel Allan McKennoch, Seattle, WA (US); Tariq Osman Omar, Seattle, WA (US); Cecil Lee Quartey, Seattle, WA (US); Keith Rosema, Seattle, WA (US); Alan Caplan, Seattle, WA (US); Richard Earl Simpkinson, Issaquah, WA (US); Istvan Fulop, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/412,356

(22) Filed: May 14, 2019

(51) Int. Cl.
G06V 20/40 (2022.01)
G06T 7/292 (2017.01)

(52) U.S. Cl.
CPC ............ *G06T 7/292* (2017.01); *G06V 20/40* (2022.01); *G06T 2207/10016* (2013.01); *G06T 2207/30228* (2013.01); *G06T 2210/21* (2013.01); *G06V 20/44* (2022.01)

(58) Field of Classification Search
CPC .......... G06T 7/292; G06T 2207/10016; G06T 2207/30228; G06T 2210/21; G06V 20/40; G06V 20/44
See application file for complete search history.

(56) References Cited

U.S. PATENT DOCUMENTS

| | | |
|---|---|---|
| 6,461,237 B1 | 10/2002 | Yoshinobu et al. |
| 6,567,116 B1 | 5/2003 | Aman et al. |
| 6,707,487 B1 | 3/2004 | Aman et al. |
| 8,447,099 B2 | 5/2013 | Wang et al. |
| 8,452,081 B2 | 5/2013 | Wang |
| 8,556,831 B1 | 10/2013 | Faber et al. |
| 9,075,405 B1 | 7/2015 | Anvari |
| 9,094,615 B2 | 7/2015 | Aman et al. |
| 9,406,131 B2 | 8/2016 | Wurmlin et al. |
| 9,602,152 B2 | 3/2017 | Wohl et al. |
| 10,008,027 B1 | 6/2018 | Baker |
| 10,009,579 B2 | 6/2018 | Wang et al. |
| 10,010,778 B2 | 7/2018 | Marty et al. |
| 10,262,426 B2 | 4/2019 | Holzer et al. |
| 10,269,121 B2 | 4/2019 | Socek et al. |
| 10,269,133 B2 | 4/2019 | Hildreth |
| 10,284,794 B1 | 5/2019 | Francois et al. |
| 10,375,287 B2 | 8/2019 | Gefen et al. |
| 10,430,994 B1 | 10/2019 | Baker |
| 10,540,773 B2 | 1/2020 | Holzer et al. |
| 10,565,722 B1 | 2/2020 | Baker |
| 10,592,747 B2 | 3/2020 | Beall et al. |
| 2006/0116185 A1 | 6/2006 | Krull |
| 2008/0192116 A1* | 8/2008 | Tamir ...................... G06T 7/292 348/157 |

(Continued)

*Primary Examiner* — Siamak Harandi

(74) *Attorney, Agent, or Firm* — Davis Wright Tremaine LLP

(57) ABSTRACT

A kinematic analysis system captures and records participant motion via a plurality of video cameras. A participant feature and participant pose are identified in a frame of video data. The feature and pose are correlated across a plurality of frames. A three-dimensional path of the participant is determined based on correlating the feature and pose across the plurality of frames. A potential impact is identified based on analysis of the participant's path.

20 Claims, 8 Drawing Sheets

(56) References Cited

U.S. PATENT DOCUMENTS

| | | |
|---|---|---|
| 2009/0141941 A1* | 6/2009 | Wagg .................... G06T 7/254 382/103 |
| 2009/0192710 A1 | 7/2009 | Eidehall et al. |
| 2009/0315978 A1 | 12/2009 | Wurmlin et al. |
| 2010/0020068 A1 | 1/2010 | House |
| 2010/0026809 A1 | 2/2010 | Curry |
| 2010/0030350 A1 | 2/2010 | House et al. |
| 2010/0283630 A1 | 11/2010 | Alonso |
| 2011/0090344 A1 | 4/2011 | Gefen et al. |
| 2012/0020518 A1 | 1/2012 | Taguchi |
| 2012/0177283 A1 | 7/2012 | Wang et al. |
| 2012/0177284 A1 | 7/2012 | Wang |
| 2013/0201330 A1 | 8/2013 | Thornton et al. |
| 2014/0169663 A1 | 6/2014 | Han et al. |
| 2014/0301598 A1 | 10/2014 | Marty et al. |
| 2014/0301601 A1 | 10/2014 | Marty et al. |
| 2015/0066448 A1* | 3/2015 | Liu ........................ G06T 7/20 703/2 |
| 2015/0227795 A1 | 8/2015 | Starner et al. |
| 2015/0317801 A1 | 11/2015 | Bentley et al. |
| 2015/0319424 A1 | 11/2015 | Haimovitch-Yogev et al. |
| 2015/0324636 A1 | 11/2015 | Bentley et al. |
| 2016/0120238 A1 | 5/2016 | Duncan et al. |
| 2016/0213300 A1 | 7/2016 | Allen et al. |
| 2016/0239976 A1 | 8/2016 | Fathi et al. |
| 2016/0267663 A1* | 9/2016 | Sicking ............. G06K 9/00771 |
| 2016/0270472 A1 | 9/2016 | Allen et al. |
| 2016/0271795 A1 | 9/2016 | Vicenti |
| 2016/0331316 A1 | 11/2016 | Allen et al. |
| 2017/0057497 A1 | 3/2017 | Laur et al. |
| 2017/0076468 A1* | 3/2017 | Krauss .................... G06T 7/292 |
| 2017/0102467 A1 | 4/2017 | Nielsen et al. |
| 2017/0123429 A1 | 5/2017 | Levinson et al. |
| 2017/0123487 A1 | 5/2017 | Hazra et al. |
| 2017/0146999 A1 | 5/2017 | Cherepinsky et al. |
| 2017/0148179 A1 | 5/2017 | Holzer et al. |
| 2018/0136660 A1 | 5/2018 | Mudalige et al. |
| 2018/0189971 A1 | 7/2018 | Hildreth |
| 2018/0255290 A1 | 9/2018 | Holzer et al. |
| 2018/0321645 A1 | 11/2018 | Caicedo Fernandez et al. |
| 2018/0322337 A1 | 11/2018 | Marty et al. |
| 2018/0326982 A1 | 11/2018 | Paris et al. |
| 2019/0005719 A1 | 1/2019 | Fleischman et al. |
| 2019/0011910 A1 | 1/2019 | Lockwood et al. |
| 2019/0011912 A1 | 1/2019 | Lockwood et al. |
| 2019/0130602 A1* | 5/2019 | Hall ....................... G06T 13/40 |
| 2019/0163191 A1 | 5/2019 | Sorin et al. |
| 2019/0171912 A1 | 6/2019 | Vallespi-Gonzalez et al. |
| 2019/0220002 A1 | 7/2019 | Huang et al. |
| 2019/0222776 A1 | 7/2019 | Carter et al. |
| 2019/0244372 A1 | 8/2019 | Holzer et al. |
| 2019/0256090 A1 | 8/2019 | Yoo et al. |
| 2019/0263401 A1 | 8/2019 | Yoo et al. |
| 2019/0287310 A1 | 9/2019 | Kopeinigg et al. |
| 2019/0293431 A1 | 9/2019 | Stelfox et al. |
| 2019/0332866 A1 | 10/2019 | Beall et al. |
| 2019/0342479 A1 | 11/2019 | Gefen et al. |
| 2019/0356885 A1 | 11/2019 | Ribeiro et al. |
| 2019/0367021 A1 | 12/2019 | Zhao et al. |
| 2020/0128899 A1* | 4/2020 | Greenblatt ............ A61B 5/7275 |

* cited by examiner

IMPACT DETECTION

BACKGROUND

Analysis of impacts between objects is often limited to manual analysis of specific events. Although sensor data may be used to facilitate such analysis, there is often a lack of related contextual information. Consequently, the circumstances surrounding the consequences of impacts on the involved individuals is not well understood.

BRIEF DESCRIPTION OF THE DRAWINGS

Various techniques will be described with reference to the drawings, in which.

DETAILED DESCRIPTION

Figure 1:
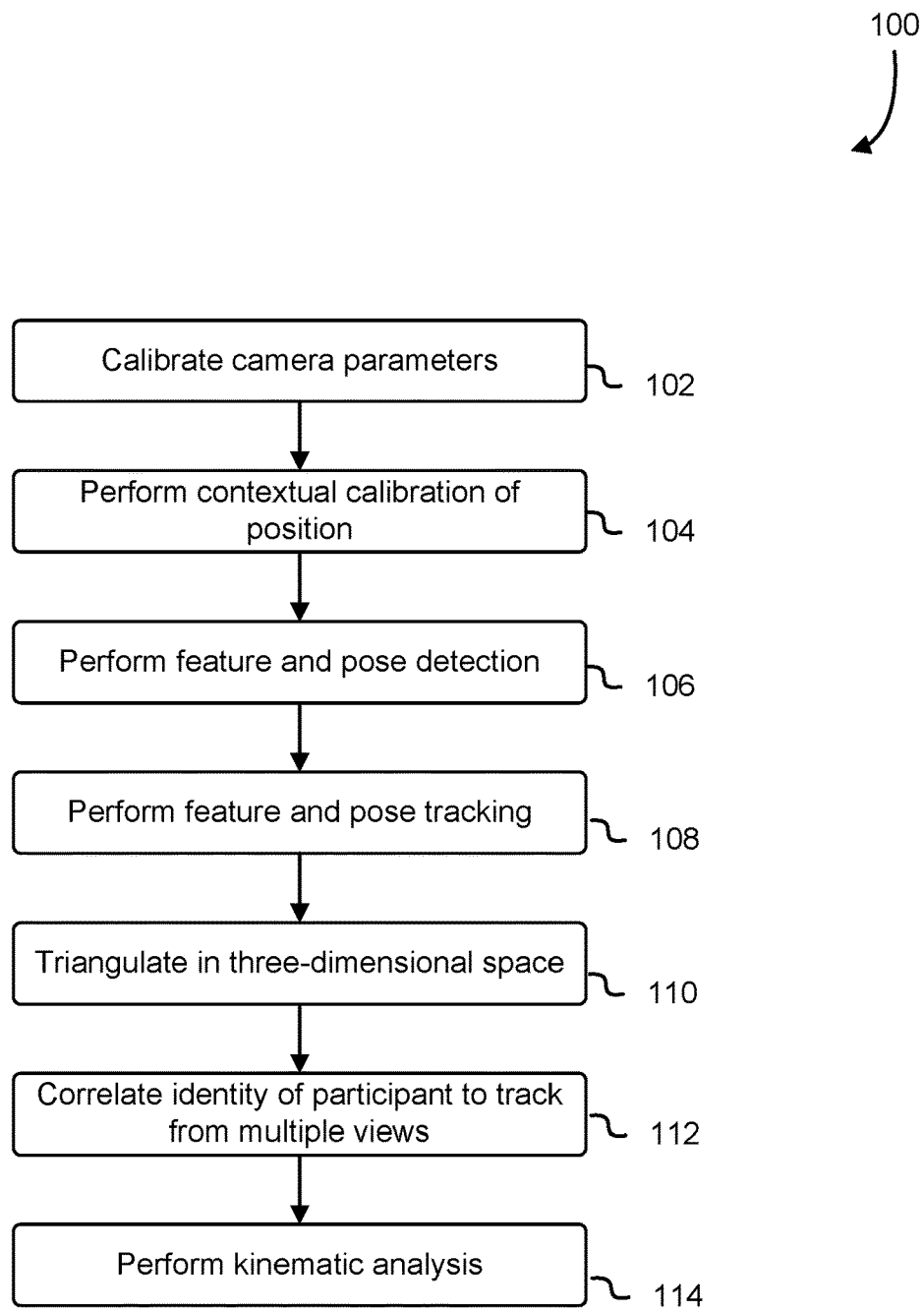
FIG. 1 is a flowchart illustrating an example of a process for obtaining and analyzing kinematic data, in accordance with various embodiments.

Techniques and systems described below relate to collection and analysis of video data as it relates to the motion of a participant in an activity, such as impacts that may occur between participants, or between a participant and an object. In one example, two or more cameras each collect video data pertaining to a portion of an area. The frames of a given camera are is analyzed to detect features and poses. The detected features and poses are tracked over time as the participants move about area. Data from the multiple cameras is correlated to improve accuracy of the tracking and to allow the motion of an individual participant to be tracked. The motion of a participant is triangulated in three dimensional space, and the resulting data used in a kinematic analysis to identify and analyze an impact.

Analysis of the consequences of an event, such as an impact, are typically performed after at least some of the consequences of the event are known. For example, an analysis of an impact and its consequences might only focus on the time-period immediately preceding the impact. Moreover, performing such an analysis might not even be considered until after the impact has occurred. A drawback of this approach is that it leads to a small subset of potentially relevant data being included in the analysis. For example, a participant might have suffered a minor injury earlier in a game, contributing to a subsequent, more serious injury later on. Yet this earlier injury might never be considered. There might also be cases in which similar events did not lead to injury, yet the circumstances which led to the avoidance of injury are never considered.

The use of sensors may facilitate kinematic analysis. However, sensors alone may not provide enough information to generate actionable insights. Embodiments of the present disclosure combine data from sensors such as participant-worn accelerometers with data derived from video sources. Data obtained from or derived from the sensors may include some combination of speed, acceleration, distance travelled, height, directional vectors, g-forces, rotational speed, and rotational acceleration. Data obtained from or derived from the video sources may include some combination of image data of various resolutions and frame rates, infrared data, compressed video data, and so forth. Embodiments may use timestamps, sequence numbers, or other information to align data the sensor-based and video-based data, and then perform an analysis on the aligned data.

Contextual elements of an event, such as impact type, may be helpful in analysis and understanding of impacts and the consequences of those impacts. Examples of impact types can include, for example, head-to-head contact, head-to-ground contact, head-to-body contact, and so forth. Other contextual elements include, but are not necessarily limited to, prior impacts, participant conditioning, and participant fatigue.

In an embodiment, analysis is performed on impacts that occur during a game or other time period. This may include impacts which might normally seem insignificant or inconsequential. For example, embodiments may generate and analyze a data set comprising a history of impacts experienced by a participant during a time period, including those impacts which might not appear, at least initially, to be associated with a potential for injury. For example, embodiments may record all impacts detected in the data, regardless of whether the severity of the impact is above some threshold level. Severity may be measured by various metrics, such as g-forces recorded by a sensor worn by the participant, severity estimates obtained by visual analysis, and so on. In an embodiment, measurements indicative of severity and other aspects of each impact are stored in a data set representative of the time-period, which may then be analyzed as a unitary set of data. For example, an artificial neural network or other machine learning mechanism might be trained to discern impacts from earlier in the time period that are relevant to impacts later in the time period.

In an embodiment, the data set comprises kinematic data and contextual parameters for impacts observed during the time period. The kinematic data and contextual data may be represented for one or more of the participants.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the technological field of video analysis, especially the technological fields of analyzing video data related to sporting events, traffic flow, as well as the technological field of impact analysis. Embodiments disclosed herein may automatically analyze a wide array of video and sensor data, and may further integrate data collected from high-fidelity sensors with data obtained from video.

Note that in some cases, video footage used for broadcast television is not well-suited for the analysis disclosed herein. In an embodiment, video data may be captured by a plurality of stationary cameras. These may be positioned so that the capture video footage of the area in which impacts may occur. Moreover, the area is captured from at least two angles to allow for triangulation. The cameras may have fixed focal length and may capture video data with a resolution of at least four pixels per real-world inch. Frame rates, in various embodiments, are at least thirty frames per second.

In an embodiment, the resolution of the cameras is selected so that identification of certain objects is possible from all locations within the area. For example, in an embodiment, resolution is sufficient to identify objects such as uniforms, jersey numbers, license plates, and so forth.

In an embodiment, the frame rate of the cameras is selected to be sufficient to record video quickly enough to derive the kinematics of the participants. In other words, the video has a high enough frame rate to derive the motion of the objects and the forces that cause the motion. The frame rate is also sufficient for capturing frames of video data during which an impact occurs.

As used herein, impact refers to contact between objects. Examples of an impact include, but are not limited to, contact between participants, contact between a participant and the ground, contact between a participant and an inanimate object, and contact between inanimate objects.

FIG. 1 is a flowchart illustrating an example of a process 100 for obtaining and analyzing kinematic data, in accordance with various embodiments. Some or all of the process 100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
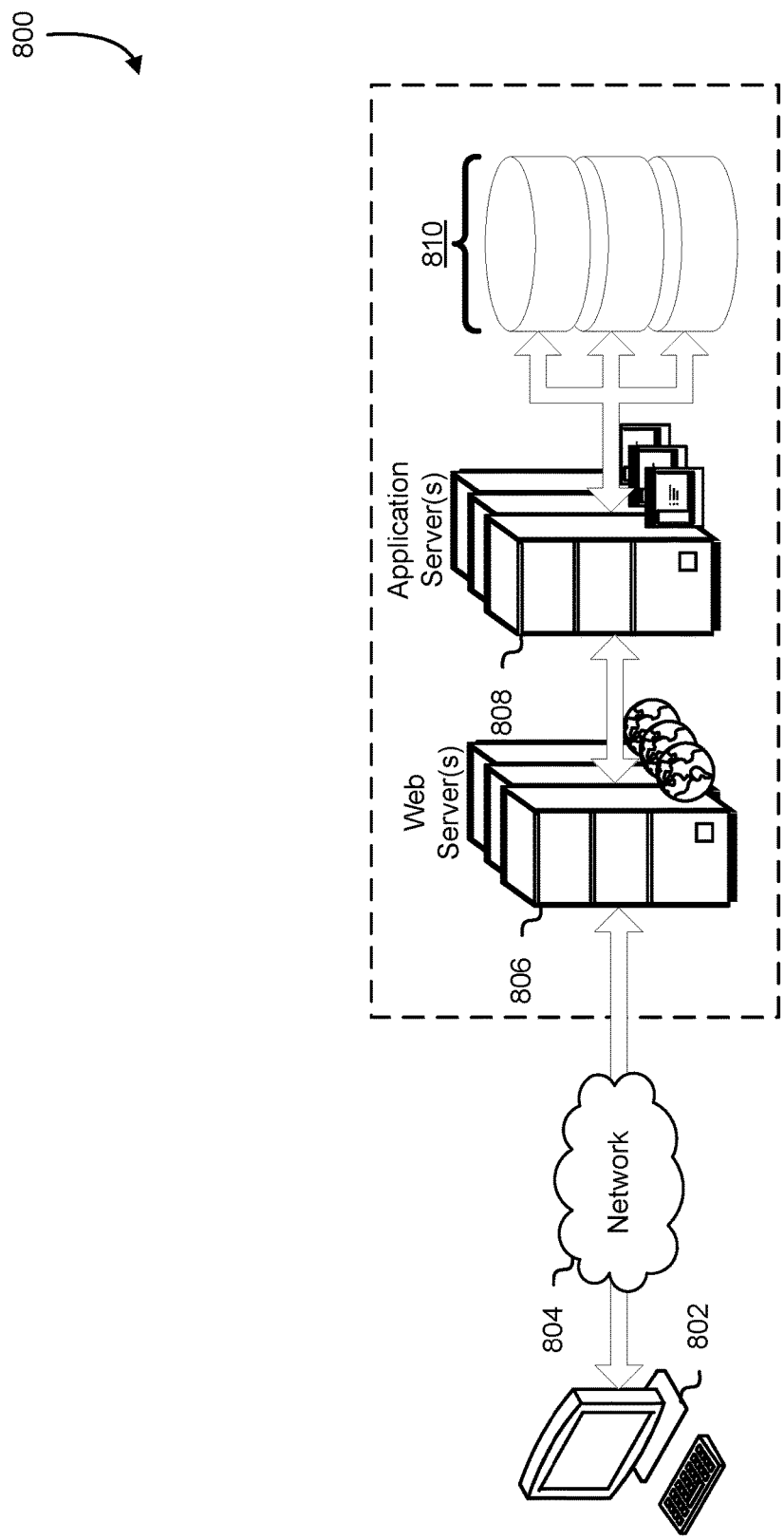
FIG. 8 illustrates an example process for analyzing video data for impact analysis, in accordance with various embodiments.

For example, some or all of process 100 may be performed by any suitable system, such as a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802. The process 10 includes a series of operations wherein images from multiple cameras surrounding an area is collected in order to support or conduct kinematic analysis. The analysis may, for example, include identifying participants and events associated with impacts, and identifying impacts that may have negative effects.

At 102, the system calibrates camera parameters. In an embodiment, transformations between the images captured by the camera and the world are derived. A camera may introduce distortion and skewing, with respect to the real world, in the image data it captures. For example, the camera lens or the angle of the camera to the area being observed may both introduce distortion and skewing into the image.

In an embodiment, the system calibrates camera parameters by capturing a real-world object, such as a calibration pattern, that is observed by the camera. For example, the camera may capture a checkerboard image from various positions within the camera's field of view. By analyzing this data with respect to the known characteristics of the pattern, the system may derive functions to correct for distortion and skewing.

In an embodiment, the calibration procedures include adjustments for both spatial and color transformations introduced by the cameras. Understanding of spatial transformations may be relevant to improving position tracking and/or impact detection. Similarly, understanding of color transformations introduced by the camera may be helpful in tracking identifying features, such as uniform colors, as well as in identifying participants. For example, the color of a uniform, or of logos or other markings, might be used to distinguish between different participants.

In an embodiment, a color transformation function is derived using image data captured from objects placed within the camera's field of view. For example, various markings having known color properties may be observable within the camera's field of view. Examples may include uniform color, logos, markings, advertisements, printed matter, displayed images, and so forth. The color of the field, or of a geographic landmark, may also be used. Knowing color values for objects in the environment, the system may then calculate the color transform using known and observed color values. In an embodiment, the transformations is updated periodically to account for changing conditions, such changes to the lighting of the area. A calibration function may be formed to predict the color transformation as a function of other parameters, including but not necessarily limited to brightness.

In an embodiment, an area under observation is divided into regions. For example, an area under observation might be divided into octants. In an embodiment, each octant has features to enable calculation of various transforms, such as transforms to correct for lens distortion, spatial distortion, color distortion, and so forth. For example, an area might be divided into octants, and a sign or other marking placed in each octant, so that it is visible to the cameras whose field of view is trained on the octant.

At 104, the system performs contextual calibration of position. This refers to how a camera's view aligns with real-world positions. For example, with respect to the camera and the area on which the camera is trained, contextual calibration can comprise identification or characterization of angle and/or distance. This data enables the system to perform transformations between image data acquired by the camera and a coordinate system representative of real-world positions. Contextual calibration can be performed, in an embodiment, based on environmental features such as markings on a court or field, signage, and so on.

At 106, the system performs feature and pose detection. Feature detection refers to identification a feature or characteristic of a participant, such as a helmet or jersey worn by the participant. Pose detection refers to detection of orientation, posture, and position of a participant. For example, in the case of human participants, pose detection comprises identifying the respective positions and orientations of the participant's body.

In an embodiment, the system performs feature detection in order to identify and continually track a participant moving about the area of observation. For example, in a field crowded with moving participants, it may be difficult to discern the position or motion of a particular participant. For example, in an embodiment, the system performs feature tracking to identify the position of the identified feature in each frame of video. In this manner, the system continually tracks the location of the participant associated with the feature. The particular feature that is tracked may be selected based on its suitability for use in tracking a participant's motion.

In an embodiment, feature tracking is performed using artificial intelligence or machine learning techniques. For example, in an embodiment a classifier is used to detect the feature in a frame of video. Examples of classifiers that may be employed include artificial neural networks, Bayesian classifiers, support vector machines, and so forth.

In an embodiment, the system employs deep learning techniques to perform feature identification. Deep learning refers to a family of machine learning techniques which employ artificial neural networks, generative models, propositional formulas, and so forth. For example, in an embodiment, a fully convolutional neural network is trained to identify and locate the feature in a frame. Using output of the fully convolutional neural network, the system generates data defining a bounding box around the feature within each frame. Over a series of frames, the position of this bounding box tracks the position of the feature, and as such also tracks the position of the participant associated with the feature.

As noted above, pose detection refers to the detection of factors such as the orientation, posture, and position of a participant. Pose detection may also involve determinations regarding whether an identified object is in a recognizable pose, and therefore likely to be associated with a participant.

Pose detection may be performed using artificial intelligence and machine learning techniques. For example, in an embodiment, deep learning is used to do pose detection. This may include a multi-branch convolutional neural network. Skeletal-based modelling or detection may also be employed. Skeletal modelling refers to generation of participant models in which key points of a skeleton or "stick figure" are identified within each frame. The system updates this model over time to capture the participant's motion.

At 108, the system performs feature tracking and pose tracking. Feature tracking refers to tracking the position of an identified feature as it moves across the field. In an embodiment, the system analyzes a series of video frames. The system identifies a feature in each of the analyzed video frames, and generates a track to represent the position of the feature in each frame. For example, the position of a uniform with a recognized color and number may be identified in each frame, and a track generated from these positions.

Embodiments may track a recognized pose in a similar fashion. A pose can be recognized in each frame, using techniques such as those disclosed herein, and a track generated as the pose is recognized in each frame. Note that the configuration of the pose may change between frames. For example, the position, angle, and facing of the participant's arms, legs, head, and/or body may change as the participant moves. These changes may, in cases and embodiments, be more continuous than they are disjoint. For example, given a suitably high frame rate of the recorded video, a change to the same participant's pose may be expected to be below a threshold level between two frames. Accordingly, the system can estimate a probability that a pose in a subsequent frame corresponds to a participant identified in an earlier frame, based at least partly on the amount of change in the recognized poses between the two frames. The system can then use this estimate, and the position of the poses, to generate a track for the participant as they move about the observed area.

In an embodiment, the generated feature and pose data is combined. The merging of the feature and pose data enables embodiments to perform various functions. For example, persons observed in the area who are not participants, such as referees, umpires, or spectators, may be eliminated from the data set or associated with a low probability of relevance. In an embodiment, the system identifies non-participants based, at least in part, on non-participants lacking an identified feature.

In addition, false identifications may be reduced, since it will be expected that the identified feature and identified pose will have positional correlation. For example, the position of the identified feature can be tracked as the participant moves about the area. Likewise, the position of the skeletal model representing the pose can also be tracked as the participant moves. The system can identify a false association between a feature and pose based on diverged between these two tracks. Similarly, the system can use correlation between the tracks to determine a confidence level for the association between a feature and a pose.

Combined feature and pose data is analyzed over multiple frames to generate data indicating the participant's track. A participant's track refers to the position of a participant over an observed period of time. Generation of such a track may be challenging due to a variety of possible factors, such as occlusion of the individual being tracked, similarity in the appearance of the individuals being tracked, particularly when viewed from a distance, and so forth.

In an embodiment, missing or occluded observations are compensated for using a predictive model. The predictive model estimates a likelihood of a participant being in a subsequent position and/or pose. This may apply even when the actual position of the participant cannot be observed due to occlusion by other participants, or by environmental features.

In an embodiment, positional estimates are corrected based on better data found in subsequent frames from the same camera image. For example, if a participant cannot be identified in a series of frames, but is identified in earlier and subsequent frames, the system can estimate the likely position of the individual based at least in part on the earlier and later-identified positions.

In an embodiment, pose can be estimated in occluded video frames using a similar technique. For example, the motion of a skeletal model can be observed, and then used to predict the pose of the corresponding participant in frames of video in which the participant is occluded from view.

At 110, the system triangulates in three-dimensional space. As noted above, the system performs contextual calibration to determine distance from the camera to real-world positions. Triangulation allows for the track positions to be converted to three-dimensional coordinates indicative of a real-world position of the tracked participant.

At 112, the system performs multi-view participant correlation. This operation involves determining whether a participant observed by one camera is the same participant viewed by another camera. If the system determines that a participant can be correlated, a track corresponding to the participant's machine can be established across frames of video collected by different camera.

In an embodiment, the system aligns tracks using contextually calibrated information, such as the information collected in operation 104. For example, the system can determine the real-world position of a track based on the track's proximity to an environmental feature or landmark. Having determined this information for a track derived from a single camera's data, the system can correlate with other tracks whose real-world position is also known.

In an embodiment, the system assigns participants to tracks based at least in part on multi-camera tracking and alignment. Note that data indicative of a participant's identity may not be available from all camera angles. For example, a participant's uniform number might be visible from some camera angles, but not others. However, once the tracks are aligned, the system can associate a determined identity with each of the aligned tracks.

In an embodiment, a name or other identifying information is assigned to each track. For example, in an embodiment, the system employs computing vision and/or deep learning techniques to discern an identifying number on clothing worn by the participant. The system then accesses a database which correlates the number to the participant's name.

In an embodiment, higher-level contextual information is used as a basis of determining a name or other identifying information about a participant. For example, certain sports may have assigned field positions, or employ certain plays, which are indicative of the name of a participant, or of the role played by the participant. The system may use this information to assign a name or role to each track. For example, at the start of an observed time period, each participant might be assumed, based on the higher-level contextual information, to be in a certain position relative to the other participants.

At 114, the system performs or enables kinematic analysis. In this stage, the system provides time-aligned three-dimensional tracks for each participant. This data enables a wide range of analysis to be performed, including for example motion analysis or kinematic analysis.

For example, analysis may be performed based on data derived from the prior operations 102-112. The data may, for example, include one or more of velocity, distance traveled, head-to-ground distance, direction, acceleration, and identification of a probable moment of impact.

In an embodiment, sensor data is integrated with the tracking data to enable higher-order analysis. For example, data from an accelerometer worn by a participant might be linked to track data determined to be associated with that participant.

In some instances, machine learning is further leveraged to identify signatures of an injury. For example, in an embodiment a neural network is trained to assess potential injury types based on acceleration profiles for an impact region, and to provide a probability that the impact resulted in the corresponding injury type. Note that here, the analysis may be added by an understanding of where an impact occurred and in what context. For example, the pose of a participant at a time of impact can be examined, and correlated to the acceleration profile.

In an embodiment, the system performs automated collection and classification of impact parameters. In a further aspect, neural network architecture is arranged so as to provide real-time collection and classification of data points. For example, the neural network can be trained to recognize impacts and to assess the potential consequences of impacts that may occur during the period of observation.

Figure 2:
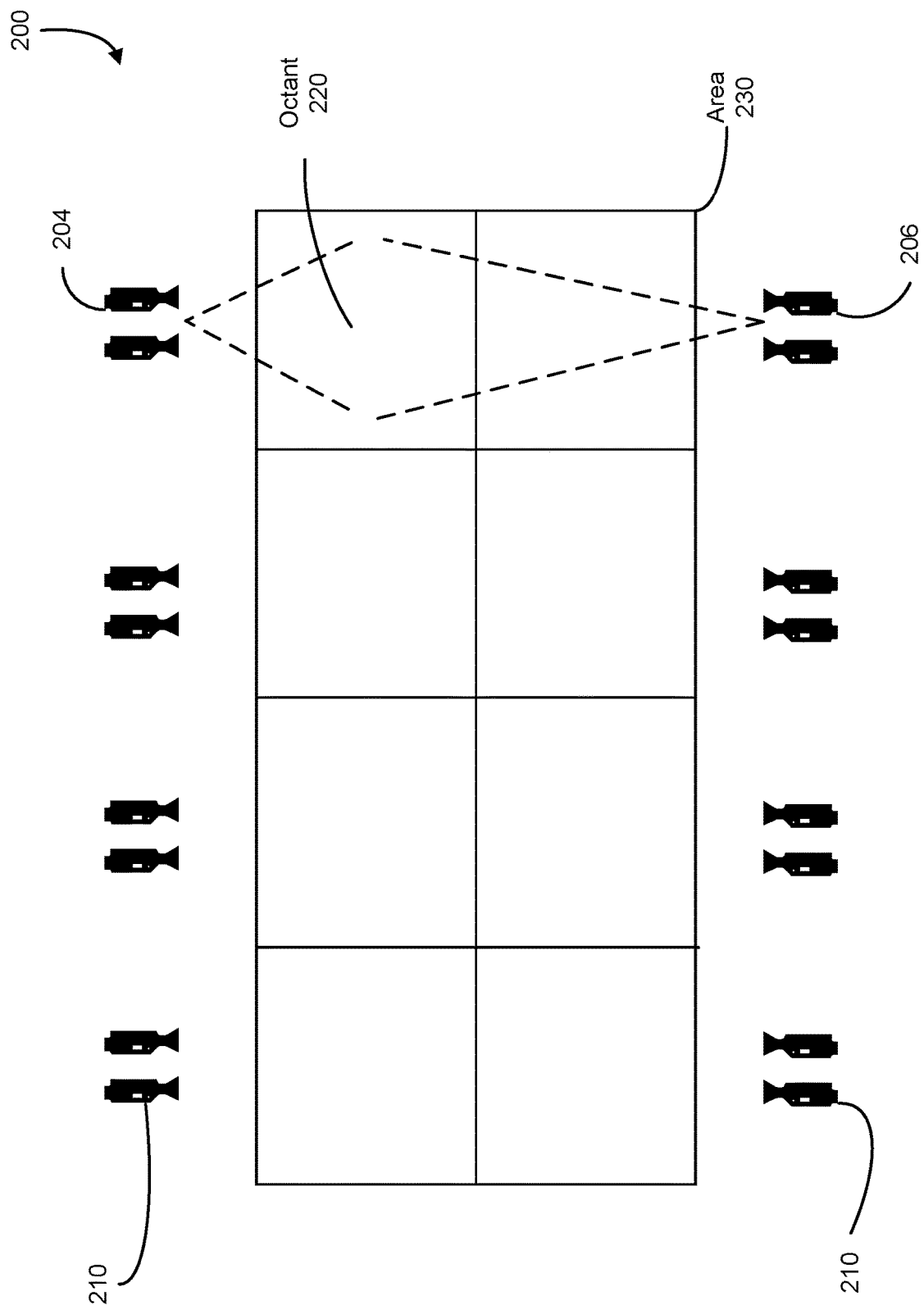
FIG. 2 illustrates an example of a camera arrangement, in accordance with various embodiments.

FIG. 2 illustrates an example 200 of a camera arrangement, in accordance with various embodiments. Sixteen cameras 210 are mounted on the periphery of an area 230. For example, the cameras may be mounted on a fixed structure above and surrounding the area 230. The cameras 210 are arranged so that at least two of the cameras 210 are capable of capturing data to the required resolution on any of eight octants of the area 230. For example, in FIG. 2, at least two cameras 204, 206 are trained on an octant 220.

In an embodiment, each of the cameras is stereoscopic, meaning that they each comprise two or more lenses for recording at least two separate streams of video from slightly offset positions. Alternatively two or more cameras might be employed at each position. Thus, in the example 200 of FIG. 2, four cameras total would be capable of capturing video of the octant 220.

Figure 3:
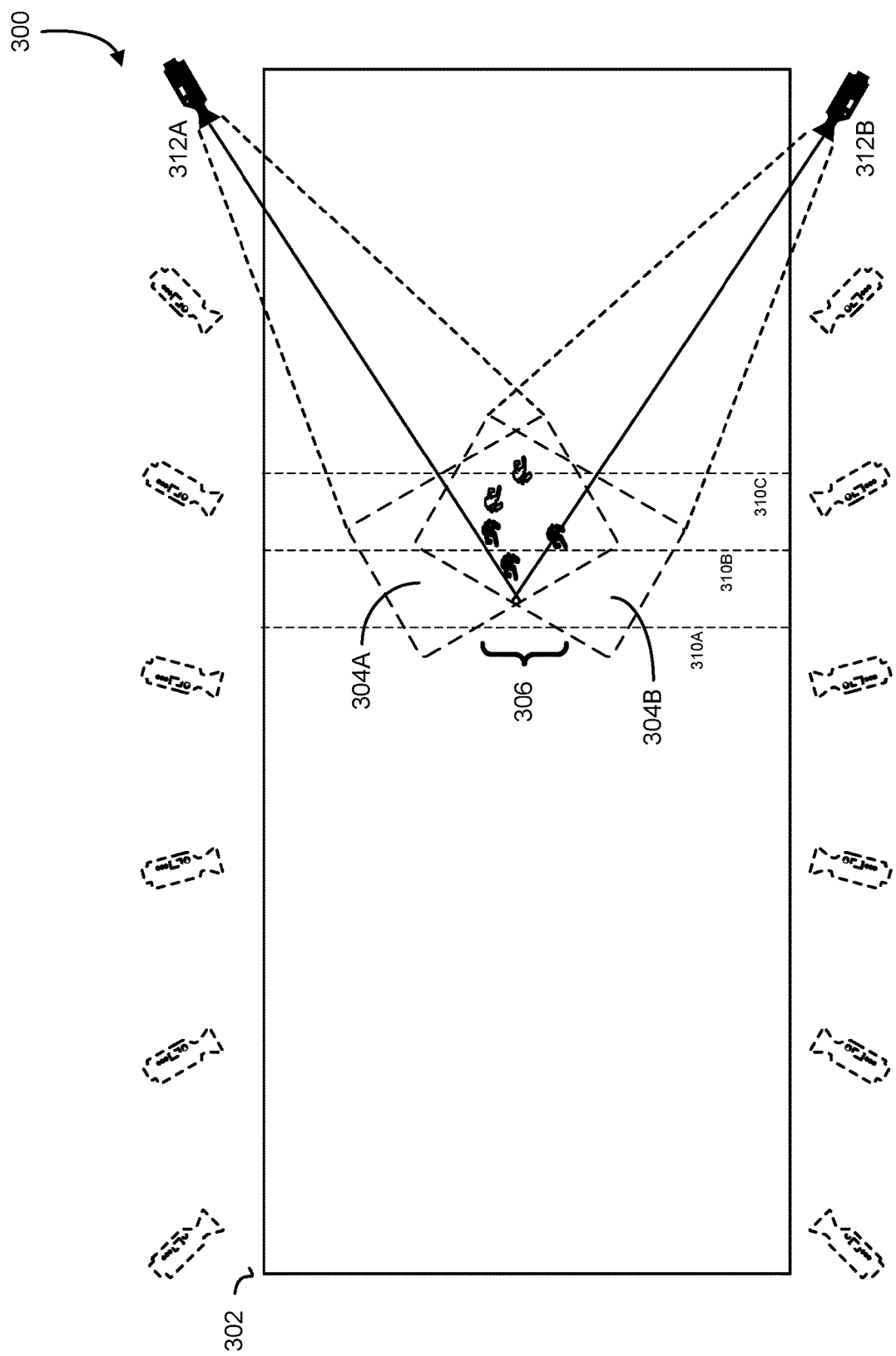
FIG. 3 illustrates an example of visually recording a physical environment, in accordance with various embodiments.

FIG. 3 illustrates an example of visually recording a physical environment, in accordance with various embodiments. Specifically, FIG. 3 depicts an example 300 of a physical environment 302 containing a plurality of participants 306 being visually recorded by a series of video recording devices 312, each having a field of view 304 of the physical environment 302.

When two cameras, such as the video recording devices 312A-312B, view a scene in the physical environment 302 from two distinct positions, epipolar geometry may be utilized to match an object in the image captured by the first recording device 312A to its corresponding object in the image captured by the second recording device 312B. In various embodiments, two objects in separate images may be said to match if they correspond to the same participant or object, or satisfy one or more matching criteria. Likewise, two trajectories of participants in separate sequences of images may match if they correspond to the same participant or satisfy one or more matching criteria. Examples of matching criteria include uniform number, helmet color, uniform colors, clothing patterns, estimated participant height, estimated participant weight, and so on. These criteria may be employed individually, or in combination.

In an embodiment, points of reference in the background of the images are determined. To illustrate using the example 300 of FIG. 3, the physical environment 302 might depict a sports field with various markings, such as parallel lines 310A-310C. As can be seen, parallel lines 310A-310C pass through both fields of view 304A-304B of the recording devices 312A-312B. The real-world coordinates for the parallel lines 310A-310C may be determined, and, likewise, the picture element (pixel) coordinates corresponding to the parallel lines 310A-310C in the captured images may be determined.

The parallel lines 310A-310C may be used to determine epipolar lines between an image captured by the first recording device 312A and the second recording device 312B. In an embodiment, a pair of cost matrices or cost functions (one for each of the pair of images captured by the first recording device 312A and the second recording device 312B) is used. A cost matrix or cost function may be used to determine distances (e.g., in pixels) of detected objects to the epipolar lines.

The physical environment 302 may be a real (e.g., non-virtual) location, at least a portion of which is being recorded as a sequence of images by one or more image capturing devices (e.g., the video recording devices 312). A sports field is one example of a physical environment 302. However, this example is intended to be illustrative, and should not be viewed as limiting the scope of the present disclosure to only the particular example provided. It is contemplated that techniques of the present disclosure may be used in a variety of physical environments, such as in areas under surveillance by security cameras, roads and/or other areas being recorded by image sensors on an automobile, and so forth. Application to various sports, such as automobile racing, track and field, soccer, tennis, and so forth is also contemplated. The techniques described may also be applied to detect various types of events, such as those related to injuries, traffic flow, and so forth.

The fields of view 304A-304B may be the extent of the physical environment 302 that is captured by the respective recording devices 312A-312B. The fields of view 304A-

304B may be solid angles (e.g., two-dimensional angles in three-dimensional space that an object subtends at a point) through which elements (e.g., pixel sensors) of the recording devices 312A-312B are sensitive to electromagnetic radiation at any one time.

The objects 306 may be a plurality of objects that are within the fields of view 304A-304B, at least a subset of which are captured (i.e., within a shared view) by both recording devices 312A-312B. In some embodiments, the objects 306 are members of sports teams playing a game in the physical environment 302. However, it is also contemplated that techniques of the present disclosure are applicable with objects 306 that are either animate or inanimate, and/or include one or more of a living (e.g., animal, plant, etc.) or non-living entity (e.g., boulder, automobile, building, etc.).

In some implementations, the objects 306 have certain visual characteristics (e.g., shape, color, pattern, etc.) usable by systems of the present disclosure to distinguish the objects 306 from the background of the physical environment 302 and/or from objects that are not of interest in the particular application of these techniques. For example, in one implementation the system identifies occurrences of a uniform jersey, helmet, or other participant apparel in images captured by the recording devices 312A-312B as being the objects 306 of interest. In this manner, background objects (e.g., a ball, referee, umpire, spectators, etc.) incidentally captured in images captured by the recording devices 312A-312B may be excluded from the objects 306 of interest identified by the system.

In some applications, the objects are generally homogeneous. In some examples, the term "homogenous" refers to uniformity (e.g., size, color, or shape) within an image such that one object of the objects is not consistently visually identifiable from another of the objects. Within an image, the object may be represented by a set of pixels, with the size of the set of pixels being affected both by the distance of the image capture device from the object as well as the resolution of the image. For example, members of a particular team might wear uniforms, helmets, or other apparel of the same size, shape, or color combination, and a set of pixels representing a participant may not include sufficient distinguishing characteristics to distinguish it from a set of pixels representing another participant. An object may be considered homogenous even if it includes certain distinguishing visible characteristics even if such the object is not distinguishable (and therefore be considered homogenous) from other of the objects due to the positions and orientations of the objects. For example, players of a particular sports team may wear uniform with the same colors and/or patterns as other players, but may have numbers and/or names printed on the uniform for identification purposes; however, in any given image, an identifying mark may be obscured or turned away from the image capture devices such that the identity of the object (e.g., a participant) is uncertain.

The recording devices 312A-312B may be may be devices for electronic motion picture acquisition or electronic still picture acquisition. In embodiments, the recording devices 312A-312B include an image sensor (e.g., charge-coupled device (CCD) or complementary metal-oxide-semiconductor (CMOS)), memory, image processing capability, and/or a microphone. The recording devices 312A-312B may be designed to record and/or communicate a digital or analog stream of media (e.g., audio, video, text, or any combination of audio, video, or text) in a manner such that the media can be replayed or reproduced on a device designed to display such media. Examples of such recording devices include a digital video camera, a web camera, mobile telephone, and so on. In embodiments, the video capture devices 312A-312B are stationary. However, it is contemplated that certain techniques of the present disclosure may be applied to non-stationary recording devices. For example, a non-stationary recording device may follow an object in motion, for example by keeping a tracked participant within its field of view for a period of time.

Figure 4:
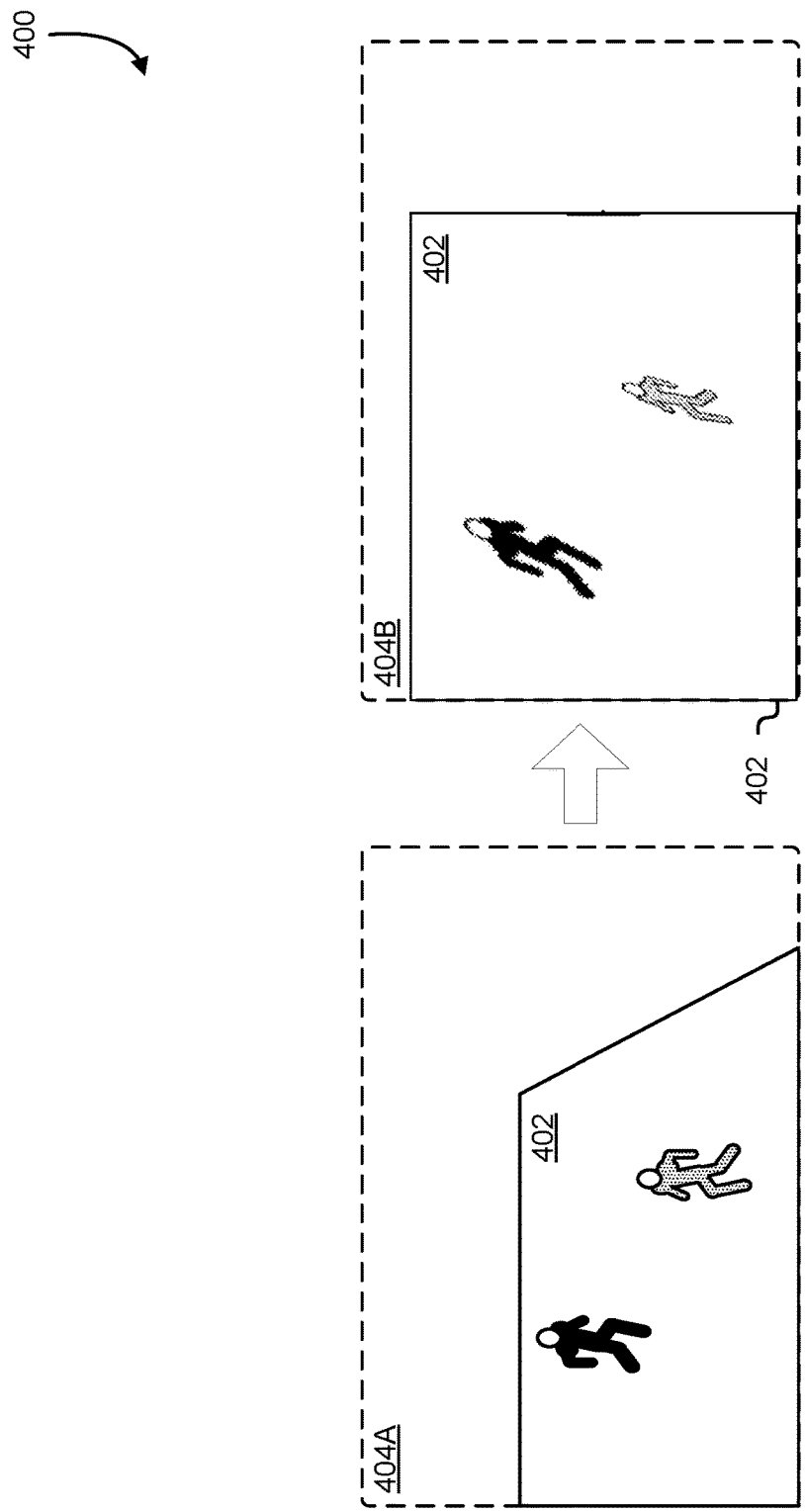
FIG. 4 illustrates an example process for transforming an image for the purpose of assigning objects in one image to objects in another image, in accordance with various embodiments.

FIG. 4 illustrates an example process 400 for transforming an image for the purpose of assigning correspondence between participants in one image to participants in another image, in accordance with various embodiments. If the background surface 402 is flat (such as the sports field of the physical environment 302 depicted in FIG. 1), the first and second images may be modified, (e.g., stretched) based on information relating to how the image capture devices (e.g., 312 of FIG. 3) are positioned relative to each other in the physical world, in order to align the image with the background surface. For example, as shown in the example 400, the image 404A, being taken from the perspective of the image capture device, renders the portion of a three-dimensional background surface in the physical world as an approximate trapezoid in two-dimensions.

The image 404B, however, shows the background surface 402 as it has been stretched to replicate the rectangular shape of the background surface in the physical world. The participants depicted in the image may become distorted in some manner in in the image 404B due to the stretching. Moreover, depending on the positions and perspectives of the image capture devices, objects in each of the images captured by the image capture devices may be distorted in differing amounts and in different directions.

The background surface 402 may be planar, although it is contemplated that techniques of the present disclosure may be applied to surfaces that are not necessarily flat or uniform in color or texture. In the physical world, the participants may make contact with the surface and interact with it, e.g., by running or walking on the surface 402.

The image 404A may be a digital image similar to the images 304A-304B described in conjunction with FIG. 3. In the example 400, a first image 404A has been captured by an image capture device positioned above and to the side of the area under observation. The second image 404B is a digital image produced by transforming the perspective of the first image 404A to another perspective. Specifically, the second image 404B has been transformed to represent an overhead perspective of the same area.

As depicted by FIG. 4, the participants in the second image 404B appear "stretched" as a result of the transformation performed on the first image 404A to produce the second image 404B. The background surface 402 in the first image 404A is transformed from an asymmetric quadrilateral shape to a rectangle in the second image 404B. Likewise, the depiction of the participants have been stretched vertically and skewed in a clockwise direction. The more distant of the objects may be transformed to a greater extent than the nearer object. Note that the degree of transformation may depend on the positioning of the camera. For example, with respect to an image simulating an overhead perspective, images obtained from a camera positioned closer to overhead would undergo less transformation than those obtained from a camera positioned nearer to the ground and off to a side.

In an embodiment, feature and pose detection is performed on images transformed according to the process depicted in FIG. 4. Regarding pose detection, the use of a skeletal modeling approach may compensate for the variable amounts of stretching and skewing of the images. The images produced by each camera may be stretched and skewed by a different amount, but the skeletal model can be generated such that it is invariant to these distortions. This may improve pose tracking between images captured by different cameras.

Figure 5:
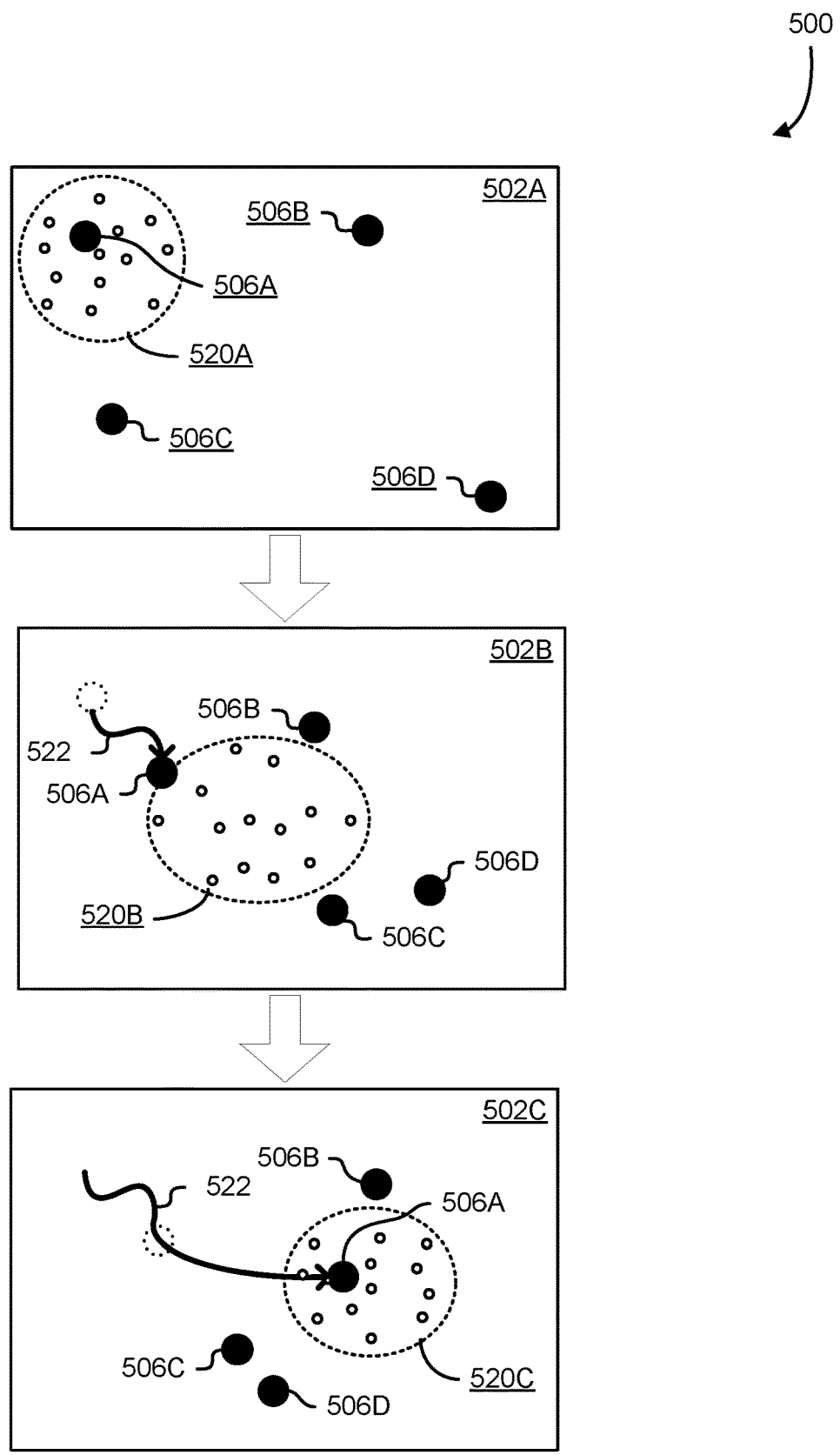
FIG. 5 illustrates a sequence of images captured over a period of time by an image capture device, in accordance with an embodiment.

FIG. 5 illustrates determining a trajectory 522 of a participant depicted in a sequence of images 502A-502C. Here, trajectory refers to the path, or track, taken by a participant as the participant moves about the area under observation. The images are captured over a period of time by an image capture device, such as one of the video recording devices 312A of FIG. 3. Within each of the sequence of images, various participants 506A-506D are in motion. A kinematic analysis system, such as a system operating in accordance with the procedure depicted by FIG. 1, may determine a trajectory for each of the depicted participants.

As seen in FIG. 5, the participants 506A-506D are depicted in motion during the time frame represented by the sequence of images 502A-502C. Note that although only the first participant 506A is shown as having a trajectory 522, it is contemplated that the trajectories may also be computed for the other participants 506B-506D.

In an embodiment, the point clouds 520A-520C are sets of points generated as a result of applying a prediction algorithm, such as one or more particle filters, to positions of the first participant 506A. Each of the set of points in the point clouds 520A-520C represents a prediction of a position of the participant 506A in the next frame.

For example, in an embodiment, particle filters apply physical laws of motions to one or more sequential measurements, such as previous positions of the participant 506A, to arrive at an estimate for a next position of the participant 506A.

In an embodiments, a particle filter is used. The particle filter may comprise a recursive filter, such as a Kalman filter. A point in the point clouds 520A-520C may be derived based on the output of such a particle filter, calculated using a present position or past position of the participant 506A as input.

As illustrated in the first image 502A, the position of the participant 506A may be input to a set of particle filters to produce the first point cloud 520A. In the example 500, the first image 502A may be the first image in the sequence, and consequently previous position and/or point cloud values for the participant 506A may be unavailable. In such a case, the one or more particle filters may be seeded with one or more default values, such as a pseudo-random Gaussian distribution of values in the vicinity of (e.g., proximate to) the participant 506A.

The participant 506A may be identified in the second image 502B as being the same as the participant 506A in the first image 502A by virtue of the object 506A in the second image 502B being in a position that lies within the region of points predicted in the point cloud 520A or within a standard deviation of one of the points predicted in the point cloud 520A. As can be seen in the example 500, the objects 506B-506D are located outside the region predicted by the point cloud 506A, and the second object 506B, although being the closest of the objects 506B-506D to the point cloud 520A, is not as close as the first object 506A. Consequently, the disclosed kinematic analysis system may determine that the first object 506A in the second image 502B corresponds to the first object 506A in the first image 502A. The system of the present disclosure may then associate the present position of the first object 506A, in the second image 502B, with the previous position of the first object 506A in the first image 502A. By so doing, the system generates the trajectory 522.

The point cloud 520B may be generated by inputting the new position of the participant 506A in the second image 502B. In an embodiment, one or more particle filters may receive, as input, a previous position of the participant in the first image 502A.

In an embodiment, the selection of particle filters used may be modified based on which, if any, of the previously applied particle filters appeared to most accurately predict the position of the participant 506A in the second image 502B. For example, the particle filters whose predictions were farthest from the subsequently determined position of the participant 506A may be replaced by different particle filter. The revised set of particle filters may then be used to generate the next point cloud 520B. On the other hand, if all of the predictions were inaccurate (e.g., greater than a threshold distance or standard deviation), additional particle filters may be used to generate the next point cloud 520B.

In the third image 502C, the participant 506A is seen to have moved to a more distant position. The system determines, based on the proximity of the participant 506A to the predictions of the point cloud 520B, that the participant 506A in the third image 502C is the same as the first object 506A from the second image 502B. Additionally or alternatively, the system may make the determination based on the velocity and direction of the participant 506A.

Consequently, the trajectory 522 may be updated to include the path traveled by the participant 506A from the point in time represented by the second image 502B to the point in time represented by the third image. The next position in the trajectory can then be calculated based on the point cloud 520C.

In some situations, due to any of a variety of factors (e.g., inclement weather, reduced image quality, obscured visibility, an object being blocked by another object, etc.) embodiments of the kinematic analysis system may be unable to detect the object 506A within a particular image frame. In such cases, the particle filter inputs may include such data and the point cloud (e.g., the point cloud 520C may) expand to cover more area to account for additional distance the first object 506A may have moved between frames. Upon redetection of the first object 506A in a subsequent frame, the trajectory 522 may be extended to the position at which the first object 506A is located in the subsequent frame. In a case where the system cannot establish the identity of a participant as being the same as a participant detected in a previous frame above a threshold level of certainty, the system may begin a separate trajectory. These trajectories may then be joined automatically or based on input from a user.

In an embodiment, the trajectory 522 represents a path taken by the participant 506A over the time period of the sequence of images 502A-502C. In an embodiment, the trajectory 522 is stored as a series of points, such as x,y,z coordinates. Embodiments may also store the trajectory 522 as a series of vectors, including position coordinates, direction, and velocity. The points of the trajectory 522 may be locations in a space, such as a three-dimensional physical space, a three-dimensional virtual space, a two-dimensional space such as an aerial view of the area represented by the images 502A-502C, a pixel coordinate space, and so forth. A line connecting each point in sequence may be considered to be the track, or path, traveled by the participant.

Figure 6:
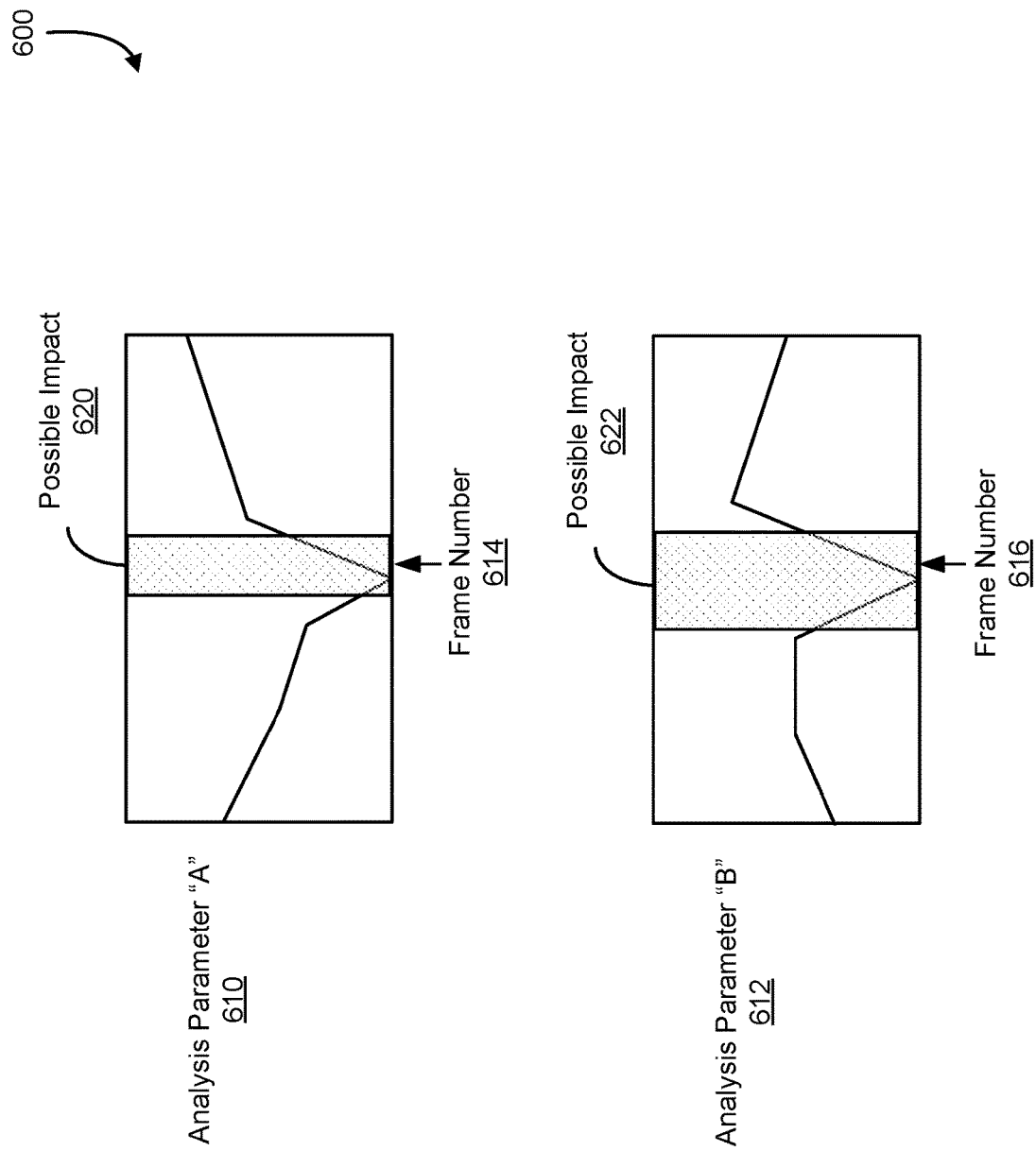
FIG. 6 illustrates an example of kinematic analysis, in accordance with various embodiments.

FIG. 6 illustrates an example of kinematic analysis, in accordance with embodiments. As seen in the example of FIG. 6, a kinematic analysis 600 may comprise two or more sub-analyses. For example, a kinematic analysis may comprise a sub-analysis of a parameter "A" 610 and a sub-analysis of a parameter "B" 612.

The kinematic analysis may further comprise correlating sensor and track data according to a timeline. For example, data used for the sub-analysis of parameter "A" 610 might be time-aligned with the data used for sub-analysis of parameter "B" 612, based on correlating frames 614, 616. Here, frames can refer to frames of video data, as well as to periods of time captured by a corresponding sensor.

Sub-analysis of parameter "A" may identify a period of time in which a possible impact 620 occurred. Likewise, sub-analysis of parameter "B" 612 may identify another period of time in which a possible impact 622 occurred.

In an embodiment, the periods of possible impact 620, 622 are correlated to improve accuracy of an impact determination. For example, confidence that an impact occurred will, in most cases, be improved by correlating periods of possible impact which coincide in time.

In an embodiment, the analyzed parameters comprise data from two or more sensors worn by a participant.

In an embodiment, the analyzed parameters comprises data from two participants. In a further aspect, track data is used to screen possible correlations. For example, if the tracks of two participants intersect, the period of time in which the intersection occurred can be analyzed to determine if sensor data for that time period is indicative of a possible impact.

In an embodiment, one or more of the analyzed parameters corresponds to information derived from pose tracking. For example, periods of time in which two or more participants are in close proximity can be identified as periods in which an impact may have occurred. Similarly, certain poses can be identified as indicative of a possible impact. The periods of time in which such poses occur can therefore be identified as a period of possible impact.

In an embodiment, periods of possible impact are identified in a plurality of sub-analyses, and then correlated to compute an estimate of a probability that an impact occurred during the correlated time period. For example, for a time period common to each sub-analysis, a confidence level can be derived. These may then be weighted and combined to arrive at an overall estimate of the likelihood of an impact having occurred in that time period.

Figure 7:
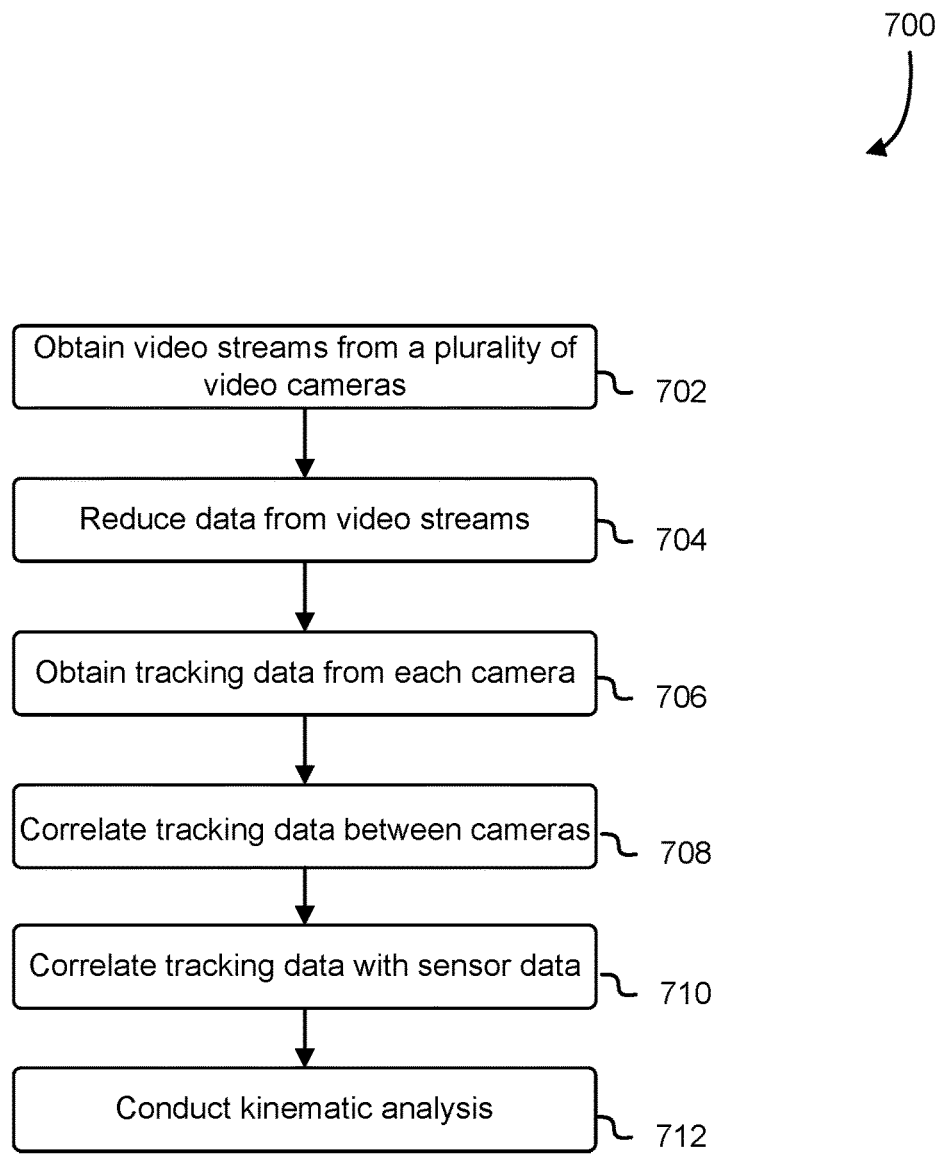
FIG. 7 illustrates an environment in which various embodiments can be implemented.

FIG. 7 illustrates an example process for analyzing video data for impact analysis, in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 800 described in conjunction with FIG. 8, such as the one or more web servers 806 or the one or more application servers 808, by multiple computing devices in a distributed system of a computing resource service provider, or by any electronic client device such as the electronic client device 802. The process 700 includes a series of operations wherein images from multiple cameras surrounding an area, such as a sports stadium or field, road, or other area, is collected and analyzed to conduct and/or support kinematic analysis.

In addition, a distributed system may be employed to perform processing steps. The processing steps may include those mentioned above, in which data not required for subsequent analysis is excluded. For example, video frames may be posted to a job queue for a pre-processing step in which relevant frames or portions of frames are identified. Other steps, as described in FIGS. 1 and 8, may also be performed by a distributed system. In an embodiment, a job queue architecture is also employed to perform these steps by a distributed system.

At step 702, the system obtains video streams from a plurality of cameras, in accordance with techniques such as those described with reference to FIG. 1.

At step 704, the system reduces data from the video streams in order to facilitate analysis. An obstacle to effective analysis of video data is the volume of data that must be analyzed. To facilitate analysis, certain frames or portions of frames of video data may be excluded from analysis.

In an embodiment, frames with little or no motion are eliminated. The system may apply various motion analysis techniques to identify those frames in which motion is below a threshold, and eliminate them. In a further aspect, frames with little or no motion within a relevant area are eliminated. For example, the motion of the region in which the participants are active might be considered, while the motion of individuals outside of that region might be disregarded. Portions of a frame that are outside of this region, e.g. outside of a field of play, can be eliminated from the analysis. For example, the frame can be cropped.

At step 706, the system obtains tracking data from each camera, using techniques such as those described with reference to FIG. 1.

At step 708, the system correlates tracking data between cameras, using techniques such as those described with reference to FIG. 1.

At step 710, the system correlates tracking data with other sensor data. The correlation comprises alignment based on timestamps for the respective frames and the sensor data, in order to identify overlapping or contemporaneous time periods for the path data and the sensor data. For example, by aligning based on time, data from an accelerometer can be correlated with the path data.

Data from additional sensors, such as accelerometer data, can be used to improve feature identification and pose identification, as well as to improve position tracking. For example, changes to a participant's speed, as indicated by accelerometer data, might be used to increase confidence in the accuracy of path data determined based on analysis of the video data. Data from additional sensors, such as accelerometer data, can also be used to fill in gaps in the video data. For example, a portion of the path for which no video data is available (e.g., because the participant is occluded from view) might be estimated based on accelerometer data.

At step 712, the system conducts or otherwise facilitate kinematic analysis, using techniques such as those described with reference to FIG. 1.

In an embodiment, sensor data is used to improve kinematic analysis. For example, an identified possible point of impact may be confirmed by alignment with data from an accelerometer that indicates rapid deceleration at the same time. Thus, the same event may be observed an identified from data derived from one or more cameras, as well as correlated data derived from an accelerometer.

Similar approaches may be applied using other sensor data, such as GPS or other position tracking devices, transmitter data, and so on.

In an embodiment, an iterative process identifying and tracking participant positions, correlating with sensor data, refining tracks based on the sensor data and tracking data derived from other cameras, and so on until a confidence threshold is reached.

In an embodiment, a system comprises at least one processor and at least one memory comprising processor-executable instructions. The instructions, when executed by the processor, cause the system to identify the positions of a feature and a pose in a frame of video data. The feature and pose are associated with a participant moving within an area observed by the video cameras. By correlating the position data, a path of the participant is identified. Various aspects of these operations are discussed herein, for example with respect to FIG. 1.

In an embodiment, the distance between the cameras and a feature or pose is identified based on a contextual clue observed by the cameras. These positions may be determined for each of a plurality of cameras trained on the area, and then triangulated to determine a three-dimensional position of the feature or pose. A path indicative of the participant's three-dimensional motion can then be determined. Various aspects of these operations are discussed herein, for example with respect to FIG. 1.

Events associated with the participant, such as impacts, can be determined based on analysis of the participant's three-dimensional path through the area. For example, the system can estimate a probability of impact during a time period by correlating a participant's three-dimensional path with the path of another participant. Likewise, the estimate of impact can be further refined based on additional sensor data correlated to the same time period. Various aspects of these operations are discussed herein, for example with respect to FIG. 1.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 800 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 8. Thus, the depiction in FIG. 8 should be taken as being illustrative in nature and not limiting to the scope of the disclosure.

The network 804 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 804 are well known and will not be discussed in detail. Communication over the network 804 can be enabled by wired or wireless connections and combinations thereof. In an embodiment, the network 804 includes the Internet and/or other publicly addressable communications network, as the environment 800 includes one or more web servers 806 for receiving requests and serving content in response thereto, although for other networks an alternative device serving a similar purpose could be used as would be apparent to one of ordinary skill in the art.

The illustrative environment 800 includes one or more application servers 808 and data storage 810. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 808 can include any appropriate hardware, software and firmware for integrating with the data storage 810 as needed to execute aspects of one or more applications for the electronic client device 802, handling some or all of the data access and business logic for an application. The one or more application servers 808 may provide access control services in cooperation with the data storage 810 and is able to generate content including, text, graphics, audio, video, and/or other content usable to be provided to the user, which may be served to the user by the one or more web servers 806 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 802 may be processed by the electronic client device 802 to provide the content in one or more forms including forms that are perceptible to the user audibly, visually, and/or through other senses. The handling of all requests and responses, as well as the delivery of content between the electronic client device 802 and the one or more application servers 808, can be handled by the one or more web servers 806 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 810 can include several separate data tables, databases, data documents, dynamic data storage schemes, and/or other data storage mechanisms and media for storing data relating to a particular aspect of the present disclosure. For example, the data storage 810 may include mechanisms for storing various types of data and user information 816, which can be used to serve content to the electronic client device 802. The data storage 810 also is shown to include a mechanism for storing log data, such as application logs, system logs, access logs, and/or various other event logs, which can be used for reporting, analysis, or other purposes. It should be understood that there can be many other aspects that may need to be stored in the data storage 810, such as page image information and access rights information, which can be stored in any of the above listed mechanisms as appropriate or in additional mechanisms in the data storage 810. The data storage 810 is operable, through logic associated therewith, to receive instructions from the one or more application servers 808 and obtain, update, or otherwise process data in response thereto. The one or more application servers 808 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 808.

In one embodiment, a user, through a device operated by the user, can submit a search request for a match to a particular search term. In this embodiment, the data storage 810 might access the user information to verify the identity of the user and obtain information about items of that type. The information then can be returned to the user, such as in a results listing on a web page that the user is able to view via a browser on the electronic client device 802. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 804. These devices also can include virtual devices such as virtual machines, hypervisors, and other virtual devices capable of communicating via the network 804.

Various embodiments of the present disclosure utilize the network 804 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 804 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 806, the one or more web servers 806 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
    at least one processor; and
    at least one memory comprising computer-executable instructions that, in response to execution by the at least one processor, cause the system at least to:
        identify a position of a feature in a frame of video data obtained from one of a plurality of video cameras, the feature associated with a participant moving in an area in a field of view of the one of the plurality of video cameras;
        identify a position of a pose in the frame of video data;
        correlate the position of the feature and the position of the pose in the frame of video data, wherein a confidence level in a position of the participant in the frame of video is determined based, at least in part, on divergence between the feature position and the pose position;
        identify a path of the participant through the area, based at least in part on the correlated position of the feature and the position of the pose in the frame of video data, and based at least in part on the determined confidence level, and based at least in part on one or more additional correlated positions of features and poses in one or more corresponding additional frames of video data; and
        identify an event associated with the participant, based at least in part on the identified path of the participant.

2. The system of claim 1, the memory comprising computer-executable instructions that, in response to execution by the at least one processor, cause the system at least to:
    determine a distance from a camera to the feature, based at least in part on a contextual cue identified in the video data.

3. The system of claim 1, wherein the path is indicative of three-dimensional motion of the participant, the three-dimensional motion determined based at least in part on triangulation of the correlated position.

4. The system of claim 3, wherein the event is identified based at least in part on the three-dimensional motion.

5. The system of claim 1, wherein the event is identified based at least in part on correlation of the path to data from one or more additional sensors.

6. The system of claim 1, the memory comprising computer-executable instructions that, in response to execution by the at least one processor, cause the system at least to:
    determine a first estimate of impact probability during a first time period, the first estimate based at least in part on the path;
    determine a second estimate of impact probability during a second time period correlated to the first time period; and
    identify the event based at least in part on the first and second estimates.

7. A computer-implemented method, comprising:
    calculating a position of a feature and a position of a pose in each of a plurality of frames of video data, the feature associated with a participant moving in an area;
    identifying a path of the participant through the area, based at least in part on correlation of the calculated positions of the feature with the positions of the pose in each of the plurality of frames of video data; and
    identifying an event associated with the participant, based at least in part on the identified path of the participant.

8. The method of claim 7, further comprising:
    estimating a distance to the feature, based at least in part on a contextual cue in the video data.

9. The method of claim 7, further comprising:
    calculating a three-dimensional position of at least one of the feature or the pose, based at least in part on triangulation of position data derived from a plurality of cameras.

10. The method of claim 7, wherein the path is indicative of three-dimensional motion of the participant through the area.

11. The method of claim 10, wherein the event is determined based at least in part on the three-dimensional motion.

12. The method of claim 7, wherein identifying the event comprises estimating impact probability during a first time period.

13. The method of claim 12, further comprising:
    determining a second estimate of impact probability during a second time period correlated to the first time period, the second estimate based at least in part on sensor data; and
    identifying the event based at least in part on the second estimate.

14. A non-transitory computer-readable storage medium storing thereon executable instructions that, as a result of being executed by one or more processors of a computer system, cause the computer system to at least:

determine a plurality of positions of a feature in a corresponding plurality of frames of video data, the feature associated with a participant moving in an area;
determine a plurality of positions of a pose in the corresponding plurality of frames of video data;
correlate the plurality of positions of the feature with the plurality of positions of the pose in the corresponding plurality of frames of video data;
identify a path of the participant through the area, based at least in part on the correlated positions, wherein the path is identified based, at least in part, on divergence and correlation between the positions of the feature and the positions of the pose; and
identify an event associated with the participant, based at least in part on the identified path of the participant.

15. The non-transitory computer-readable storage medium of claim 14, wherein the instructions further comprise instructions that, as a result of being executed by the one or more processors, cause the computer system to:
estimate a distance to the feature, based at least in part on a contextual cue in the video data.

16. The non-transitory computer-readable storage medium of claim 14, wherein the instructions further comprise instructions that, as a result of being executed by the one or more processors, cause the computer system to:
calculate a three-dimensional position of at least one of the feature or the pose, based at least in part on triangulation of position data derived from a plurality of cameras.

17. The non-transitory computer-readable storage medium of claim 14, wherein the path comprises three-dimensional data indicative of three-dimensional motion of the participant.

18. The non-transitory computer-readable storage medium of claim 17, wherein the instructions further comprise instructions that, as a result of being executed by the one or more processors, cause the computer system to:
identify the event based at least in part on the three-dimensional motion of the participant.

19. The non-transitory computer-readable storage medium of claim 14, wherein the event is identified based at least in part on the path and based at least in part on data from a sensor worn by the participant.

20. The non-transitory computer-readable storage medium of claim 14, wherein the instructions further comprise instructions that, as a result of being executed by the one or more processors, cause the computer system to:
determine a first estimate of impact probability during a first time period, the first estimate based at least in part on the path;
determine a second estimate of impact probability during a second time period correlated to the first time period; and
identify the event based at least in part on the first and second estimates.

\* \* \* \* \*